US007158649B2

(12) United States Patent
Garber et al.

(10) Patent No.: US 7,158,649 B2
(45) Date of Patent: Jan. 2, 2007

(54) HEARING AID STORAGE CASE WITH HEARING AID ACTIVITY DETECTION

(75) Inventors: Richard S. Garber, Saint Paul, MN (US); Barbara K. Burgum, Deephaven, MN (US)

(73) Assignee: Engenity LLC, Saint Paul, MN (US)

( * ) Notice: Subject to any disclaimer, the term of this patent is extended or adjusted under 35 U.S.C. 154(b) by 855 days.

(21) Appl. No.: 10/085,070

(22) Filed: Mar. 1, 2002

(65) Prior Publication Data

US 2003/0165250 A1 Sep. 4, 2003

(51) Int. Cl.

| | |
|---|---|
| ***H04R 25/00*** | (2006.01) |
| *H04R 29/00* | (2006.01) |
| *H04M 11/00* | (2006.01) |

(52) U.S. Cl. .......................... 381/322; 381/60; 379/52

(58) Field of Classification Search ................. 379/52, 379/55.1, 56.1; 326/104, 114; 381/60, 712, 381/322, 323, 324

See application file for complete search history.

(56) References Cited

U.S. PATENT DOCUMENTS

| | | | | |
|---|---|---|---|---|
| 4,095,057 | A * | 6/1978 | Power et al. | 381/60 |
| 4,379,988 | A * | 4/1983 | Mattatall | 381/323 |
| 5,347,584 | A | 9/1994 | Narisawa | 381/323 |
| 5,712,919 | A | 1/1998 | Ruhling | 381/316 |
| 6,128,392 | A | 10/2000 | Leysieffer et al. | 381/318 |
| 6,134,329 | A | 10/2000 | Gao et al. | 381/60 |

* cited by examiner

*Primary Examiner*—Vivian Chin
*Assistant Examiner*—Brian Ensey
(74) *Attorney, Agent, or Firm*—Oliff & Berridge, PLC

(57) ABSTRACT

A storage case that detects and indicates presence of oscillating or quiescent activity of hearing aids is disclosed. Within the storage case, there is a transducer coupled to a logic circuit. The logic circuit is further coupled to one or more visual cues. The transducer picks up any sounds within the storage case and converts the sounds into electrical signals. The logic circuit receives the electrical signals and activates a visual cue that alerts the user if the logic circuit interprets at least one of the electrical signals to be from an oscillating or quiescent activity of the hearing aid.

14 Claims, 4 Drawing Sheets

HEARING AID STORAGE CASE WITH HEARING AID ACTIVITY DETECTION

BACKGROUND OF THE INVENTION

1. Field of Invention

This invention is directed to storage cases for hearing aids. More particularly, this invention is directed to storage cases which are employed by the hearing aid users when the hearing aids are not being used, i.e., when the hearing aids are removed from the users' ears.

2. Description of Related Art

Hearing aids are generally used by people whose hearing is impaired. By using a hearing aid, the user is able to hear sounds which otherwise would not be heard. A popular hearing aid is a miniaturized ear insertion device that contains a microphone, an amplifying circuit and a loud speaker. These hearing aids are usually provided with a rotary switch that provides for volume (gain) control. Usually, the rotary switch can be rotated to an off position.

A hearing aid user frequently removes the hearing aid from his or her ear for various reasons, including to sleep. In many of these instances, the user wants to turn off the hearing aid to conserve battery power, but inadvertently increases the volume control to maximum volume instead (e.g., by rotating the volume control knob in the wrong direction). In other instances, the user simply forgets to turn off the hearing aid upon removal.

When a hearing aid is "on" and set on an acoustically reflective surface such as a nightstand, the loud speaker may become acoustically coupled to the microphone due to inherent "noise" in the hearing aid, which may create an oscillating phenomenon with an acoustic output. This oscillating phenomenon dissipates battery energy as acoustical energy. Because the user's hearing is impaired, the user does not hear this oscillating phenomenon. This results in the battery of the hearing aid being prematurely and unnecessarily drained, thereby shortening the battery life.

Hearing aid storage cases are known which automatically turn off hearing aids when the hearing aids are properly aligned in the cases. However, many users find the proper alignment of the hearing aids in these storage cases to be inconvenient and difficult, and these cases do not work with all brands and models of hearing aids.

Thus, there is a need in the art for an apparatus which signals hearing aid users when they have removed their hearing aids, but have forgotten or inadvertently neglected to turn the hearing aids off. This invention addresses this need, as well as other needs apparent from this disclosure.

SUMMARY OF THE INVENTION

This invention provides a storage case for one or more hearing aids, wherein the storage case includes apparatus which activates one or more visual cues to indicate whether the hearing aid is oscillating within the case. According to one embodiment, there is a transducer within the storage case coupled to a visual cue. When the transducer detects that the hearing aid is oscillating, the transducer activates the visual cue thereby alerting the user as to the oscillation (which is caused when the hearing aid within the case is on). In other embodiments, the transducer is coupled to a logic circuit instead of to the visual cue(s). The logic circuit is further coupled to one or more visual cues.

In certain embodiments, a switch mechanism may be provided which is coupled to the logic circuit. This switch mechanism may operate as follows. When the user opens the lid of the storage case to insert the hearing aid and closes the lid after insertion of the hearing aid, the switch mechanism is triggered and activates the logic circuit for a predetermined period. During this period, the transducer picks up any sounds within the storage case and converts the sounds into electrical signals. The logic circuit receives the electrical signals and activates a visual cue that alerts the user if the logic circuit interprets at least some of the electrical signals to be from an oscillating hearing aid.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 2:
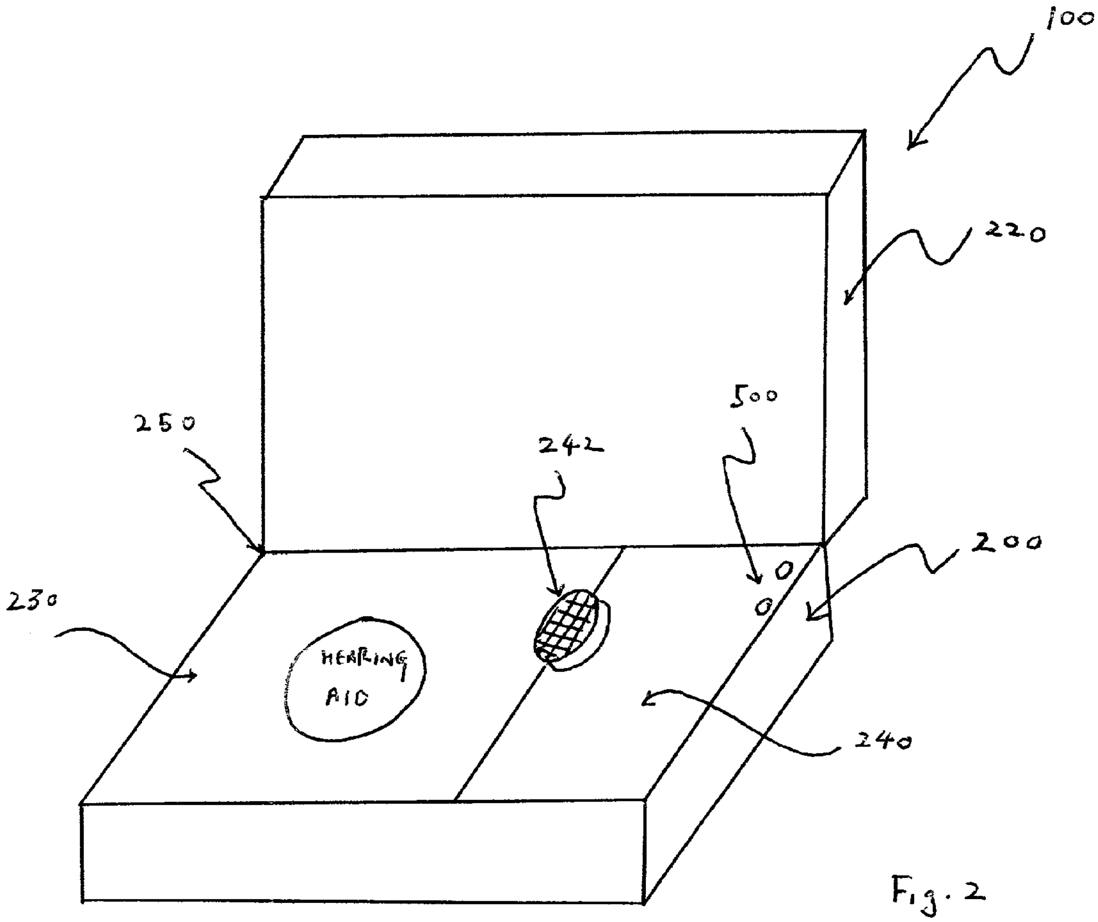
FIG. 2 is a perspective view of the exemplary hearing aid storage case of FIG. 1, in the open position.
Figure 1:
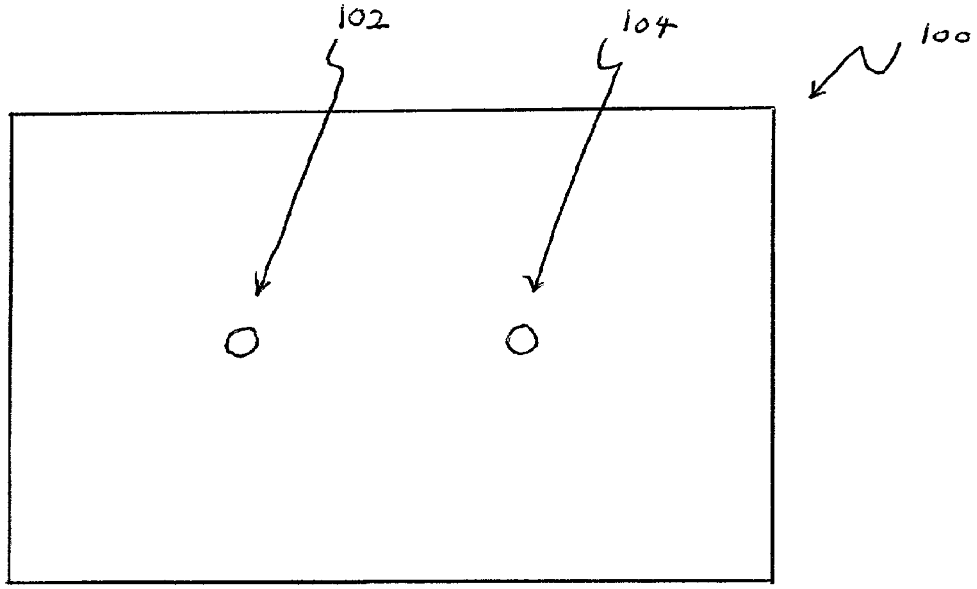
FIG. 1 is a top view of an exemplary hearing aid storage case (in the closed position) in accordance with an embodiment of the invention.

An exemplary embodiment of a storage case in accordance with this invention, storage case 100, is illustrated in FIGS. 1 and 2. The storage case 100 can be molded using well known thermoplastics such as ABS and the like, or it can be made of any other suitable materials. This invention is not limited to storage cases of particular types of materials.

The storage case 100 comprises a storage case base 200 and a storage case lid 220. The storage case can be any type of container or storage member, such as a drawer-type, envelope-type, etc. In this embodiment, the storage case lid 220 is attached to the storage case base 200 by a hinge 250 that enables the storage case lid 220 to pivot between an open and a closed position. In other embodiments, storage case lid 220 may be attached to storage case base 200 by another means, or storage case lid 220 may be completely detachable from storage case base 200.

Preferably, when the storage case lid 220 is in the closed position, at least a partial seal is formed between the contours of the storage case lid 220 and the contacting surfaces of the storage case base 200. However, in certain embodiments, such a seal may not be provided. The purpose of this seal is to reduce the risks that sounds external to the storage case 100 will interfere with sounds generated within the storage case 100. As an additional measure, the storage case lid 220 and/or the storage case base 200 can be sound-proofed, if desired, to minimize the external sounds propagating through the storage case lid 220 and storage case base 200.

In this embodiment, two visual cues 102, 104, spaced apart, are embedded in the outer top surface of the storage case lid 220. In other embodiments, only one visual cue may be provided, as discussed below. In yet other embodiments, a third visual cue to indicate low battery power may be added. While the cues 102, 104 of this embodiment are embedded in the storage case 100, the cues 102, 104 can be attached to the storage case 100 in any suitable manner and can be external to the storage case 100. Moreover, the visual cues 102, 104 can be placed at any location in or on the storage case 100, such as at a side of the storage case 100. Further, the individual visual cues can be embedded in different surfaces of the storage case 100, e.g., the visual cue 102 could be in the top surface of storage case lid 220 and the visual cue 104 would be in another surface. It is desirable to place the visual cues 102, 104 on the storage case 100 where they are highly visible to the user.

In this embodiment, the visual cues 102, 104 are light emitting diodes (LEDs), miniature light bulbs, liquid crystal displays (LCDs) and the like. Any other types of visual indicators may be employed. A green LED and a red LED are used in the embodiment as the visual cues 102, 104. These colors were selected based on a general understanding that green usually signifies a normal condition and red usually signifies an abnormal condition. However, colors are a matter of design preference and other colors can be used.

The storage case base 200 includes a compartment 230 in which one or more hearing aids can be placed or stored. The storage case lid 220 may have a lower surface which is complementary with the upper surface of the storage case base 200, such that a cavity is defined between the upper surface of the storage case base 200 (specifically, compartment 230) and the lower surface of the storage case lid 220 which firmly receives the hearing aid, so that the hearing aid is not moveable within the cavity when storage case lid 220 is in the closed position.

Further, the storage case base 200 includes an enclosed section 240 which contains a transducer such as a microphone 242, a switch mechanism 500, a logic circuit 600 and a power source such as a battery 650. In other embodiments, the enclosed section 240 could be in the storage case lid 220, or in both the storage case base 200 and the storage case lid 220.

In this embodiment, the microphone 242 is placed on the top wall of the enclosed section 240 to detect sounds within the compartment 230. The microphone 242 can be placed anywhere where it is able to detect sounds within the compartment 230.

The switch mechanism 500 (described below) is placed on a top surface of the enclosed section 240 at a location where the switch mechanism 500 contacts the storage case lid 220 when the storage case lid 220 is in the closed position. This switch mechanism can be placed anywhere where it can detect opening and closing of the storage case lid 220.

Figure 5:
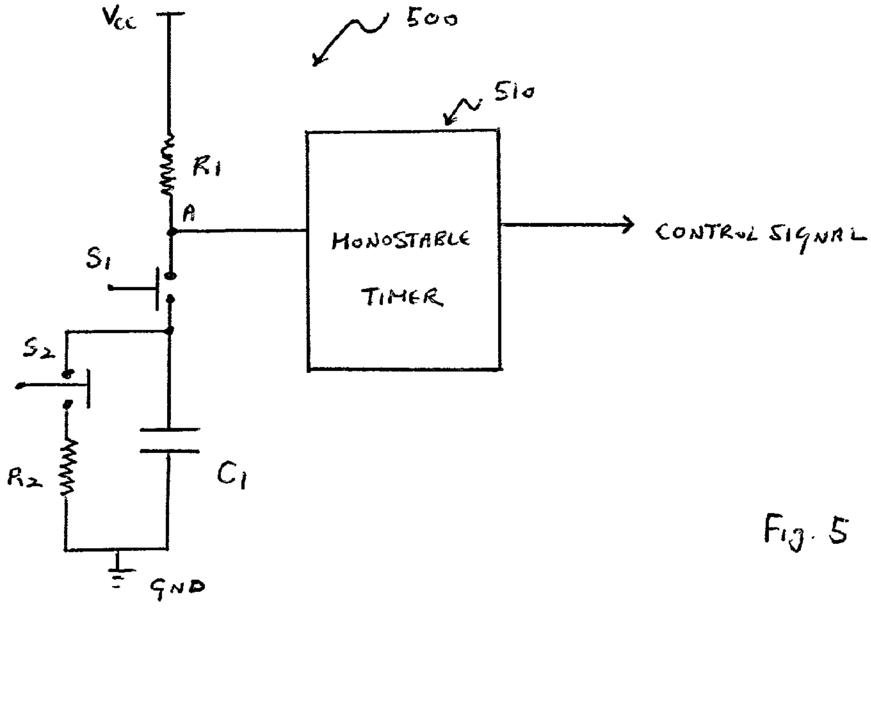
FIG. 5 is a top view of an exemplary hearing aid storage case (in the closed position) in accordance with an alternative embodiment of the invention.

FIG. 5 is an exemplary switch mechanism 500 in accordance with this embodiment of the invention. The switch mechanism 500 is triggered when the storage case lid 220 of the storage case 100 is opened and remains in the "on" position for a predetermined period of time after the storage case lid 220 is closed. The switch mechanism 500 includes switch S1, switch S2, resistor R1, resistor R2, capacitor C1 and a 555 monostable timer 510. Switch S1 is a push switch that is closed circuit when its switch is pressed and switch S2 is a push switch that is an open circuit when its switch is pressed. Switch S1 has a first connection coupled to a first connection of the resistor R1. A second connection of resistor R1 is connected to a battery. The first connection of switch S1 is further coupled to an input of the 555 monostable timer 510. A second connection of the switch 51 is coupled to a first connection of the capacitor C1 and a second connection of the capacitor C1 is connected to a ground rail GND. The second connection of the switch S1 is further coupled to a first connection of the switch S2. A second connection of switch S2 is coupled to a first connection of resistor R2, and a second connection of resistor R2 is connected to the ground rail GND.

The switch mechanism 500 operates as follows. When the storage case lid 220 is closed, switch S1 is open and switch S2 is closed, blocking a flow of current from the battery to the ground rail GND. This results in zero voltage across the capacitor C1. When the storage case lid 220 is opened, switch S1 closes and switch S2 opens and the voltage at point A drops instantaneously to zero and then rises exponentially towards the battery at the charging period proportional of a resistor RI value and a capacitor C1 value. This creates a trigger pulse of sufficiently short duration to turn on the monostable timer 510. The 555 monostable timer 510 determines the operational period of the logic circuit 600. The 555 monostable timer 510 activates the battery 650, which energizes the logic circuit 600 (see FIG. 6). When the storage case lid 220 is again closed, switch S1 opens and switch S2 closes and the charge stored in the capacitor C1 is discharged through resistor R2 to the ground rail GND thereby reverting the capacitor C1 to zero voltage. This prepares the switch mechanism 500 for the next opening of the storage case lid 220.

Figure 6:
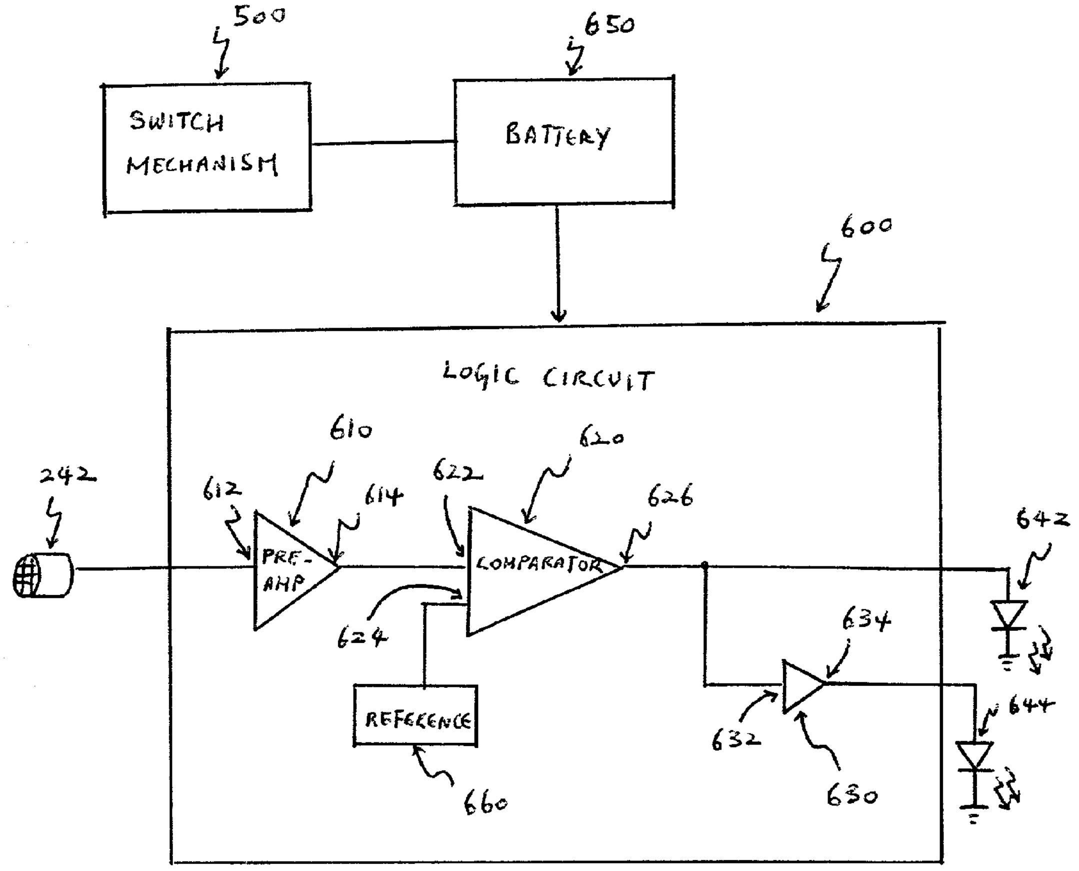
FIG. 6 is a schematic diagram of an exemplary electrical circuit in accordance with an alternative embodiment of the invention.

FIG. 6 is a schematic diagram of an exemplary logic circuit 600 contained in the enclosed section 240 of the storage case 100. The logic circuit 600 is coupled to the battery 650, which in turn is coupled to the switching mechanism 500. In an alternative embodiment, the battery 650 may be obviated and instead, the storage case 100 may be provided with a power cord that can be plugged to an electrical outlet.

In this embodiment, the logic circuit 600 comprises a pre-amplifier 610, a comparator 620 and a NOT gate 630. The pre-amplifier and the comparator can be built using off-the-shelf components such as op-amps. An input 612 of the pre-amplifier 610 is coupled to the microphone 242 and an output 614 of the pre-amplifier 610 is coupled to an input 622 of the comparator 620. Another input 624 of the comparator 620 is coupled to a reference signal 660. An output 626 of the comparator 620 is coupled to a visual cue, which is a red LED 642. The output 626 of the comparator 620 is further coupled to an input 632 of the NOT gate 630 and the output 634 of the NOT gate 630 is coupled to another visual cue, which is a green LED 644.

The logic circuit 600 operates as follows. When power is supplied to the logic circuit 600 from the battery 650, the pre-amplifier 610 is able to receive at its input 612 the electrical signals produced by the microphone 242. The electrical signals represent sounds detected by the microphone 242. The pre-amplifier 610 amplifies the electrical signals to signal levels that can be processed by the comparator 620. The comparator 620 receives the amplified signals at its first input 622.

In another embodiment, a sensitivity of a microphone produces electrical signals having amplitudes proportionate to the acoustic signals' amplitudes at the microphone. The resulting electrical signals are filtered to select a band of frequencies most likely to be associated with hearing aid oscillations. After the signal has been filtered, it is rectified and averaged. The resulting DC level is then compared to a reference, and, depending on the result of the comparison, the appropriate visual cue is activated.

At its second input 624, the comparator 620 receives the reference signal 660 which can be stored in a memory or received from other suitable sources. The amplified signals are compared to the reference signal 660 by the comparator 620. If the amplified signals are below a certain threshold of the reference signal 660, the comparator 620 generates a logic low output signal. In this instance, the red LED 642 connected to the output 626 of the comparator 620 is off. However, the NOT gate that is also coupled to the output 626 of the comparator 620 receives the logic low signal at its input 632 and produces a logic high signal at its output 634. Thus, the NOT gate 630 produces a logic high signal that turns on the green LED 644. This indicates to the user that the hearing aid is not oscillating inside the storage case 100.

Conversely, if the amplified signals is above a certain threshold of the reference signal 660, the comparator 620 produces a logic high signal. In this instance, the red LED 642 connected to the output 626 of the comparator 620 turns on. This alerts the user that the hearing aid is oscillating in the storage case 100. The NOT gate 632 receives a logic high signal at its input 632 and produces a logic low signal at its output 624. Because the NOT gate 630 is producing a logic low signal, the green LED 644 is turned off. In an alternative embodiment, the NOT gate 330 and the green LED 634 can be eliminated so that the red LED 342 turns on when the logic circuit 600 detects an oscillating hearing aid.

Figure 3:
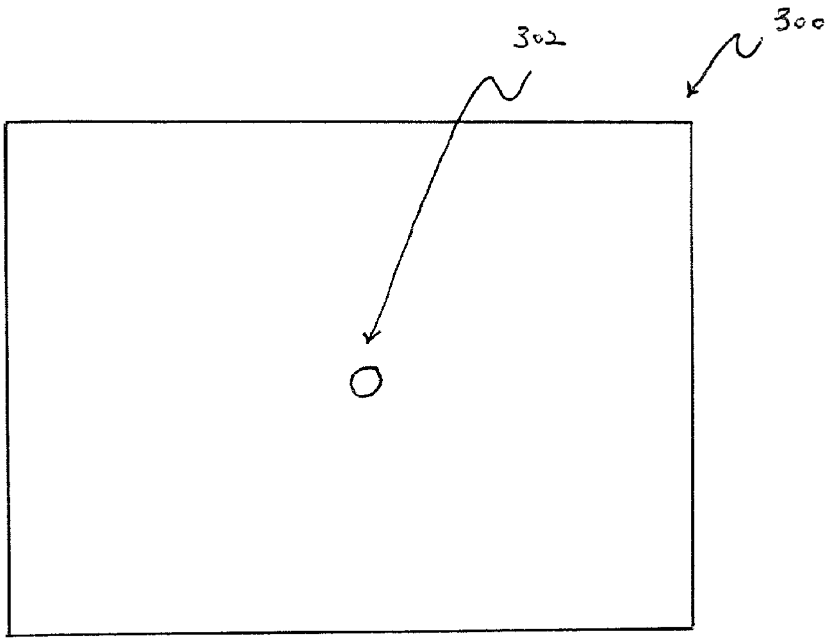
FIG. 3 is a schematic diagram of an exemplary logic circuit in accordance with an embodiment of the invention.
Figure 4:
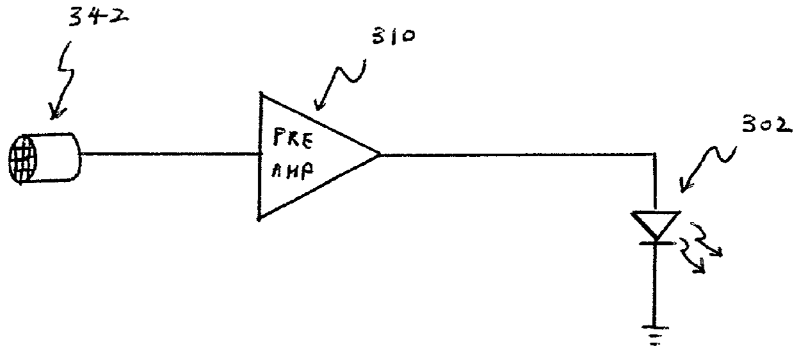
FIG. 4 is a schematic diagram of an exemplary switch mechanism in accordance with an embodiment of the inventions.

FIGS. 3 and 4 is an alternative embodiment of an exemplary storage case 300 in which only a single visual cue 302 is provided. In this embodiment, a transducer 342 provided in the storage case 300 detects any oscillation of the hearing aid stored in the storage case 300. The transducer 342 converts the oscillation into electrical signals that activate the visual cue 302 thereby alerting the user. In this embodiment, an optional amplifier circuit 310 such as an op-amp can be used to boost the transducer's electrical signals that is sufficient to drive the visual cue 302.

Figure 7:
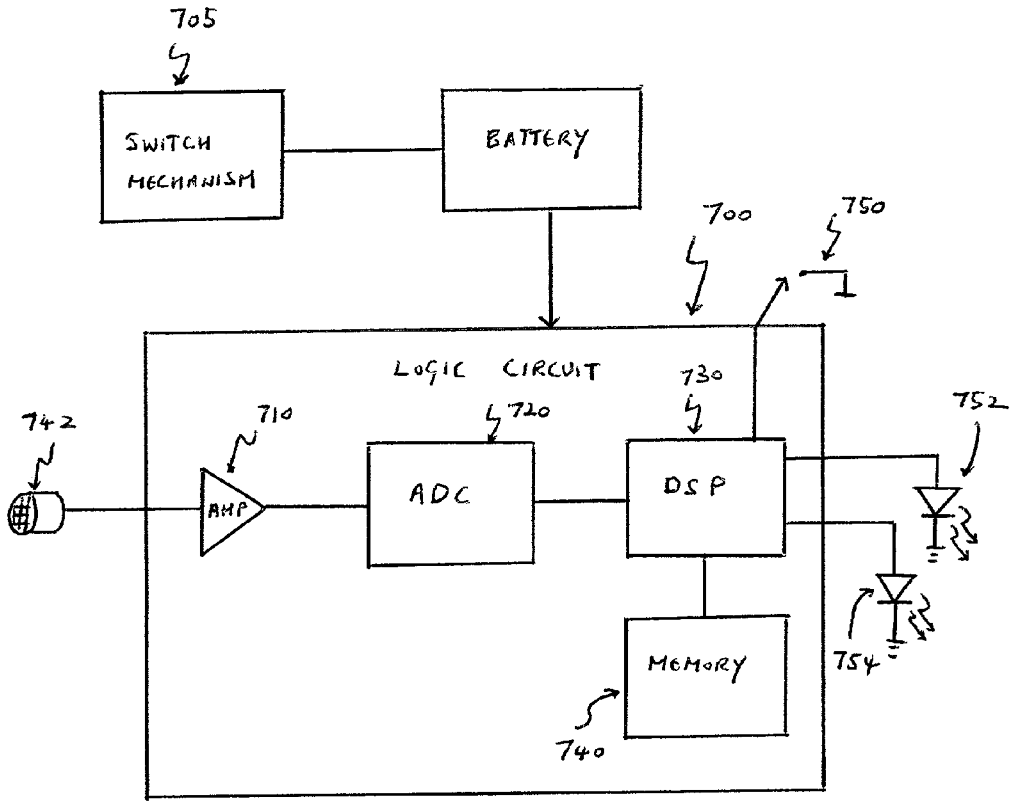
FIG. 7 is an alternative embodiment of an exemplary logic circuit that detects a quiescent activity of a hearing aid.

FIG. 7 is a schematic diagram of an exemplary logic circuit 700 that detects a quiescent activity of a hearing aid. The logic circuit 700 may be contained in an enclosed section of a storage case such as the one shown in FIGS. 1 and 2. The logic circuit 700 comprises an analog to digital converter (ADC) 720, a digital signal processor (DSP) 730, a memory 740 and one or more visual cues 752, 754. In one embodiment, the storage case is made of a material that significantly attenuates the ambient sound of the environment in which the case resides.

The operation of the logic circuit 700 is as follows. The opening of the lid causes a lid switch detector 705 to activate the ADC 720, the DSP 730 and the memory 740. After the lid is closed the logic circuit 700 continues to be operative for a pre-determined period. Thus, the logic circuit 700 operates when the lid is open, and for a predetermined period after the lid is closed. During this operation period, a microphone 742 picks up sounds and converts the sounds into analog electrical signals. An optional amplifier 710 may be added to the logic circuit 700 if necessary to boost the generated analog signals of the microphone 742. The analog signals are transmitted to the ADC 720 which converts the analog signals into digital signals suitable for processing by the DSP 730. The DSP 730 receives the digital signals and compares them with data stored in the memory 740. The DSP 730 activates a visual cue 752, 754 based on the result of this comparison. Methods of storing data in the memory 740 will now be described.

According to one embodiment, the user is instructed to adjust the hearing aid to a normal volume level, insert the hearing aid within the storage case, set a training switch 750 coupled to the DSP 730 in a "training" position and close the lid. The sounds generated by the hearing aid when at normal volume is processed by the DSP 730 so that this noise signature $v(t_{\O})$ is recorded and stored in the memory 740 during the operative period of the logic circuit 700. After the training is complete, anytime the lid switch 705 is activated (i.e., when the storage case lid is opened), the DSP 730 records received digitized signals from the ADC 720 within the operative period $v(t_{OPEN})$. The DSP 730 also records the digitized signals within a predetermined window of time around the lid closing, $v(t_{CLOSE})$. A comparison of the digitized signals is made such if:

$$v(t_{OPEN})-v(t_{CLOSE})=\O(\text{some signals other than } n*v(t_{\O})) \quad (1)$$

or $$v(t_{OPEN})-v(t_{CLOSE})=n*v(t_{\O}) \quad (2)$$

where n is a scaling factor

The comparison of signals with equation (1) indicates with a high degree of certainty that the hearing aid is off. The signals conformance with equation (2) indicates with n being a scaling factor, that the hearing aid is probably on.

In another embodiment, the training switch 750 is eliminated. But the storage case lid and/or the storage case base is made sufficiently sound-proof. If $v(t_{CLOSE})\neq 0$ or above a predetermined threshold then the hearing aid is probably on.

In another embodiment, the microphone 742 is replaced with an antenna (such as a coil of wire) to detect a change in the electromagnetic field once the hearing aid is stored in the storage case. Usually, the field produced by the DSP 730 is subtracted from the post-lid action ambient.

In instances where the hearing aid does not produce an electromagnetic field of sufficient strength to be detected, a combination of some or all the methods described above may be used to create a reliable system of detecting hearing aids that were left on, but are not oscillating.

As described above, the present invention provides a case for a hearing aid which detects whether the hearing aid is oscillating when it is in the case in one embodiment. In another embodiment, the present invention provides a case for a hearing aid which detects a quiescent activity of the hearing aid. The logic circuit can be built using off-the-shelf parts or alternatively, the logic circuit can be a customized part. In other embodiments, the transducer is connected directed to a visual cue, these obviate the need for a logic circuit. In these embodiments, the visual cue is activated when the transducer detects sounds within the storage case, indicating presence of an oscillating hearing aid. Conversely, the visual cue is not activated when the transducer does not detect sounds above a predefined threshold level within the storage case. In instances where the electrical signals of the transducer are weak, a pre-amplifier can be used to boost the signals. In another embodiment, the switch mechanism can be replaced with a simple switch that powers the logic circuit continuously when the storage case lid is closed.

While this invention has been described with specific embodiments thereof, it is evident that many alternatives, modifications, and variations will be apparent to those skilled in the art. Accordingly, the preferred embodiments of the invention as set forth herein are intended to be illustrative and not limiting. Various changes may be made without departing from the spirit and scope of the invention.

What is claimed is:

1. A hearing aid case comprising:

a compartment to receive at least one hearing aid;

a transducer to detect and convert oscillations in the compartment into electrical signals;

a logic circuit coupled to the transducer;

a first visual cue that is activated by the logic circuit if the logic circuit determines that the electrical signals produced by the transducer are indicative that the hearing aid is oscillating; and a second visual cue that is activated by the logic circuit if the logic circuit determines that the electrical signals produced by the transducer are not indicative that the hearing aid is oscillating.

2. The hearing aid case as in claim 1, wherein the logic circuit further comprises:

a reference signal or level source adapted to produce a reference signal; and a comparator having a first input coupled to the transducer and a second input coupled to the reference signal source, wherein the comparator is adapted to produce a first output if a difference between the electrical signals and the reference signal is indicative that the hearing aid is oscillating and a second output if the difference between the electrical signals and the reference signal is not indicative that the hearing aid is oscillating.

3. The hearing aid case as in claim 1, further comprising:

a storage case base; and a lid pivotally attached to the storage case base, the storage case base and lid forming the compartment when the lid is in a closed position.

4. The hearing aid case as in claim 3, further comprising:

a switch mechanism which permits power to be transmitted to the logic circuit when the lid is placed in an open position.

5. The hearing aid case as in claim 4, wherein the switch mechanism permits power to be transmitted to the logic circuit for a period of time after the lid is placed in a closed position.

6. The hearing aid case as in claim 3, further comprising:

a switch mechanism which permits power to be transmitted to the logic circuit when the lid is in a closed position.

7. The hearing aid case as in claim 1, wherein the logic circuit further comprises:

an amplifying circuit to amplify the electrical signals produced by the transducer.

8. A hearing aid case comprising:

a compartment to receive at least one hearing aid;

a transducer to detect and convert oscillations in the compartment into electrical signals;

a logic circuit coupled to the transducer;

a first visual cue that is activated by the logic circuit if the logic circuit determines that the electrical signals produced by the transducer are above a predetermined threshold level; and a second visual cue that is activated by the logic circuit if the logic circuit determines that the electrical signals produced by the transducer are below the predetermined threshold level.

9. The hearing aid as in claim 8, wherein the predetermined threshold level represents signals other than an oscillation of a hearing aid.

10. A method for detecting oscillation of a hearing aid in a storage case, the method comprising:

providing a compartment in the storage case;

placing at least one hearing aid in a compartment;

using a transducer to convert oscillations in the compartment into electrical signals;

using a logic circuit to determine if the electrical signals are indicative of the hearing aid that is oscillating;

activating a first visual cue if the logic circuit determines that the electrical signals are indicative of the hearing aid that is oscillating; and activating a second visual cue if the logic circuit determines that the electrical signals are not indicative that the hearing aid is oscillating.

11. The method as in claim 10, further comprising:

the logic circuit comparing the electrical signals with a reference signal to determine if the hearing aid is oscillating.

12. The method as in claim 10, further comprising:

powering the logic circuit for a predetermined period of time after the hearing aid is placed in the compartment.

13. A hearing aid storage case that indicates whether the hearing aid has been properly turned off for storage, comprising:

a compartment to receive at least one hearing aid, a storage case base and a lid pivotally attached to the storage case base forming the compartment when the lid is in a closed position;

a transducer to detect and convert oscillations in the compartment into electrical signals;

a logic circuit coupled to the transducer;

a first visual cue that is activated by the logic circuit; and a switch mechanism that permits power to be transmitted to the logic circuit when the lid is placed in an open position, wherein the switch mechanism permits power to be transmitted to the logic circuit for only a period of time after the lid is placed in a closed position, the time period being sufficient to enable the logic circuit to determine whether the electrical signals produced by the transducer are indicative that the hearing aid is oscillating and activating the first visual cue to signify whether the hearing aid has been properly turned off or left on.

14. A method for detecting whether a hearing aid in a storage case has been properly turned off, the method comprising:

providing a compartment in the storage case;

placing at least one hearing aid in the compartment;

using a transducer to convert oscillations in the compartment into electrical signals;

using a logic circuit to determine if the electrical signals are indicative of the hearing aid oscillating or being turned off, the logic circuit comparing the electric signals with a reference signal to determine if the electric signals are indicative of the hearing aid being turned off; and activating a first visual cue indicative of whether the hearing aid has been properly turned off, wherein the method further comprises turning on the hearing aid prior to placing the hearing aid in the compartment;

monitoring a noise generated by the turned on hearing aid; and storing the noise of the hearing aid in a memory as the reference signal.

* * * * *